(12) United States Patent
Park (10) Patent No.: US 7,106,522 B2
(45) Date of Patent: Sep. 12, 2006

(54) ZOOM LENS

(75) Inventor: Young-Woo Park, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 10/989,591

(22) Filed: Nov. 16, 2004

(65) Prior Publication Data
US 2005/0105192 A1    May 19, 2005

(30) Foreign Application Priority Data
Nov. 17, 2003    (KR)   ....................... 10-2003-0081137

(51) Int. Cl.
*G02B 15/177* (2006.01)
(52) U.S. Cl. ...................................... 359/689; 359/676
(58) Field of Classification Search ................ 359/686, 359/689, 676, 683
See application file for complete search history.

(56) References Cited

U.S. PATENT DOCUMENTS

| | | | |
|---|---|---|---|
| 6,545,819 B1* | 4/2003 | Nanba et al. ................ | 359/689 |
| 2003/0117716 A1* | 6/2003 | Sekita .......................... | 359/680 |

FOREIGN PATENT DOCUMENTS

| JP | 56-123512 A | 9/1981 |
|---|---|---|
| JP | 63-292106 A | 11/1988 |
| JP | 05-172071 A | 7/1993 |
| JP | 06-094996 A | 4/1994 |
| JP | 11-084243 A | 3/1999 |
| JP | 2002-14284 A | 1/2002 |

* cited by examiner

*Primary Examiner*—Scott J. Sugarman
*Assistant Examiner*—Darryl J. Collins
(74) *Attorney, Agent, or Firm*—Gardner Carton & Douglas LLP (57) ABSTRACT

The present invention is directed to a zoom lens which includes, in order from an object side: a first lens group having a negative refractive power; a second lens group having a positive refractive power; and a third lens group having a positive refractive power. While zooming from a wide-angle position to a telephoto position, the distance between the third lens group and an image side is greater at the wide-angle position than at the telephoto position. The zoom lens satisfies the following conditional expression:

$$1.0 \leq \frac{L_{II}}{\sqrt{f_W f_T}} \leq 1.5$$

where $f_W$ denotes the total focal length at the wide-angle position; $f_T$ denotes the total focal length at the telephoto position; and $L_{II}$ denotes the moving distance of the second lens group from the wide-angle position to the telephoto position.

17 Claims, 4 Drawing Sheets

ZOOM LENS

CROSS REFERENCE TO RELATED APPLICATION

This application claims priority to and the benefit of Korea Patent Application No. 10-2003-81137 filed on Nov. 17, 2003 in the Korean Intellectual Property Office, the entire content of which is incorporated herein by reference.

BACKGROUND OF THE INVENTION (a) Field of the Invention

The present invention relates to a zoom lens. More specifically, the present invention relates to a zoom lens for cameras using an image pickup device such as a charge-coupled device (CCD).

(b) Description of the Related Art

Recently, the use of electronic still cameras and video cameras employing a CCD or a solid-state image pickup device has been expanding rapidly, while the needs for miniaturization and weight/cost savings have also been increasing. Miniaturization and weight/cost savings are needed for zoom lenses that are built into cameras.

An optical system using a solid-state image pickup device employs a crystal filter so as to prevent moiré caused by the periodical structure of the image pickup device. Therefore, the thickness and location of the crystal filter must be taken into consideration in designing optical systems to secure a long retrofocal length. In particular, the telecentricity of an incident ray to the image side to face an image-forming plane is an important factor of the design.

Conventional optical systems using a solid-state image pickup device include: Japanese Patent Application Laid-open No. SHO 56-123512, Japanese Patent Application Laid-open No. SHO 63-292106, Japanese Patent Application Laid-open No. PYUNG 6-94996, Japanese Patent Application Laid-open No. PYUNG 5-173071, Japanese Patent Application Laid-open No. PYUNG 11-84243; and Japanese Patent Application Laid-open No. 2002-14284.

The zoom lens disclosed in Japanese Patent Application Laid-open No. SHO 56-123512 comprises, in order from the object side, a first lens group having a negative refractive power, and a second lens group having a positive refractive power. The second lens group is moved to perform zooming. The first lens group is moved to compensate for the movement of an image point caused by the zooming. The first and second lens groups are moved along the optical axis during the zooming, so the overall length of the optical system is greatly changed to increase the structure complexity of the lens barrel. This makes it difficult to achieve a zoom ratio of greater than 2× and particularly to realize miniaturization of the optical system.

The zoom lens disclosed in Japanese Patent Application Laid-open No. SHO 63-292106, is a lens system that does not change its overall length while zooming. This lens system may include a first lens group having a negative refractive power and remaining fixed while zooming, a second lens group having a positive refractive power and moving along the optical axis while zooming, and a third lens group having a positive refractive power. The second and third lens groups are moved towards the object side while zooming from the wide-angle position to the telephoto position, so the overall length of the optical system must be increased to achieve a performance correction at a wide angle. This increases the size of the optical system, and the miniaturization of the system becomes difficult.

The zoom lens disclosed in Japanese Patent Application Laid-open No. PYUNG 6-94996 is a three-group zoom lens that includes a third lens group having a negative or positive refractive power on a second lens group to enhance the zoom ratio and realize a compact optical system in the two-group zooming system. In the zoom lens, the first and second lens groups move along the optical axis to perform a zooming with the third lens group fixed. However, this may change the overall length of the optical system and attain a zoom ratio of only about 2×.

The zoom lens disclosed in Japanese Patent Application Laid-open No. PYUNG 5-173071 comprises, in order from the object side, a first lens group having a negative refractive power, a second lens group having a positive refractive power, a third lens group having a negative refractive power, and a fourth lens group having a positive refractive power. The respective lens groups are moved while zooming, so the configuration of the lens barrel is too complex.

The zoom lens disclosed in Japanese Patent Application Laid-open No. PYUNG 11-84243 comprises, in order from the object side, a first lens group having a negative refractive power, a second lens group having a positive refractive power, and a third lens group having a positive refractive power. The zooming is performed in the direction of decreasing the distance between the first and second lens groups and the distance between the second and third lens groups. In this structure, the distance between the second and third lens group decreases towards the telephoto position, so the focusing according to the distance from the object must be performed with the first or second lens group. But, the number of lenses to be moved during the focusing is increased, because the first and second lens groups have many more lenses than the third lens group. This increases focusing errors, and makes the miniaturization of the optical system more difficult due to the large size of the movable parts.

The zoom lens disclosed in Japanese Patent Application Laid-open No. 2002-14284 comprises a first lens group having a negative refractive power, a second lens group having a positive refractive power, and a third lens group having a positive refractive power. In the zoom lens, the first, second and third lens groups are moved to perform a zooming, achieving a zoom ratio of 2× to 3× with 5 to 8 lenses. However, the number of lenses increases with an increase in the zoom ratio, making it difficult to attain a miniature zoom lens with a high zoom ratio.

SUMMARY OF THE INVENTION

The present invention provides a miniature zoom lens as a photographing optical system of a camera using an image pickup device. The zoom lens has a high zoom ratio with a small number of lenses. The present invention provides a zoom lens that has telecentricity and excellent optical performance with chromatic aberration corrected.

In one embodiment, a zoom lens may include, in order from an object side: a first lens group including a first lens having a negative refractive power and a convex meniscus surface facing the object side, and a second lens having a positive refractive power, the first lens group entirely having a negative refractive power; a second lens group including a third lens having a positive refractive power, and a fourth lens having a negative refractive power, the second lens group entirely having a positive refractive power; and a third lens group including at least one fifth lens having a positive refractive power, the third lens group entirely having a positive refractive power. While zooming from a wide-angle position to a telephoto position, the distance between the third lens group and an image side is greater at the wide-angle position than at the telephoto position. The zoom lens satisfies the following conditional expression:

$$1.0 \leq \frac{L_{II}}{\sqrt{f_W f_T}} \leq 1.5$$

where $f_W$ denotes the total focal length at the wide-angle position; $f_T$ denotes the total focal length at the telephoto position; and $L_{II}$ denotes the moving distance of the second lens group from the wide-angle position to the telephoto position.

In another embodiment, a zoom lens may include, in order from an object side: a first lens group including a first lens having a negative refractive power and a convex meniscus surface facing the object side, and a second lens having a positive refractive power, the first lens group taken as a whole having a negative refractive power; a second lens group including a third lens having a positive refractive power, and a fourth lens having a negative refractive power, the second lens group taken as a whole having a positive refractive power; and a third lens group including at least one fifth lens having a positive refractive power, the third lens group taken as a whole having a positive refractive power. While zooming from a wide-angle position to a telephoto position, the distance between the third lens group and an image side is greater at the wide-angle position than at the telephoto position. The zoom lens satisfies the following conditional expression:

$$0.5 \leq \frac{f_{IP}}{|f_I|} \leq 1.1$$

where $f_I$ denotes the focal length of the first lens group; and $f_{IP}$ denotes the focal length of the lens having a positive refractive power in the first lens group.

The zoom lens selectively further satisfies the following conditional expressions:

$$1.2 \leq \frac{|f_I|}{\sqrt{f_W f_T}} \leq 1.5,$$

$$1.0 \leq \frac{f_{II}}{\sqrt{f_W f_T}} \leq 1.3,$$

where $f_{II}$ denotes the focal length of the second lens group, or $$1.5 \leq \frac{f_{III}}{\sqrt{f_W f_T}} \leq 2.0$$

where $f_{III}$ denotes the focal length of the third lens group.

In a zoom lens embodiment, the first lens of the first lens group and the third lens of the second lens group has at least one aspheric surface. In this case, the zoom lens further satisfies the following conditional expression:

$$|n_{In} - n_{Ip}| \leq 0.15$$

where $n_{In}$ denotes the refractive index of the lens having a negative refractive power in the first lens group at d-line; and $n_{Ip}$ denotes the refractive index of the lens having a positive refractive power in the first lens group at d-line.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, an embodiment of the invention has been shown and described, by way of illustration of the best mode contemplated by the inventor of carrying out the invention. As will be realized, the invention is capable of modification in various obvious respects, all without departing from the invention. Accordingly, the drawings and description are to be regarded as illustrative in nature, and not restrictive.

Embodiments of the present invention provide a zoom lens that has a high zoom ratio and can be miniaturized as a photographing optical system of cameras using an image pickup device.

Figure 1:
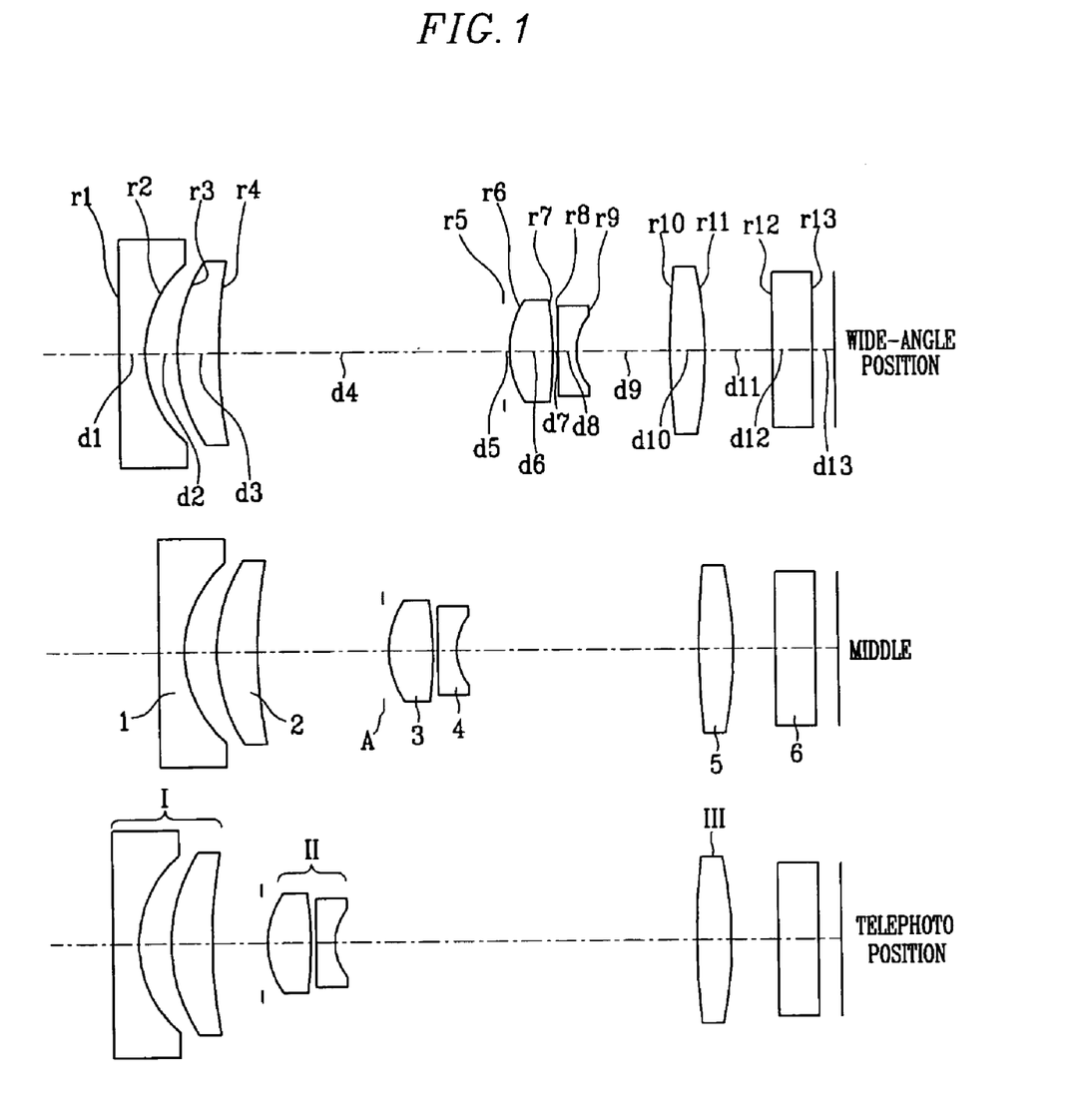
FIG. 1 illustrates the configuration of a zoom lens according to a first embodiment of the present invention by zoom position.
Figure 3:
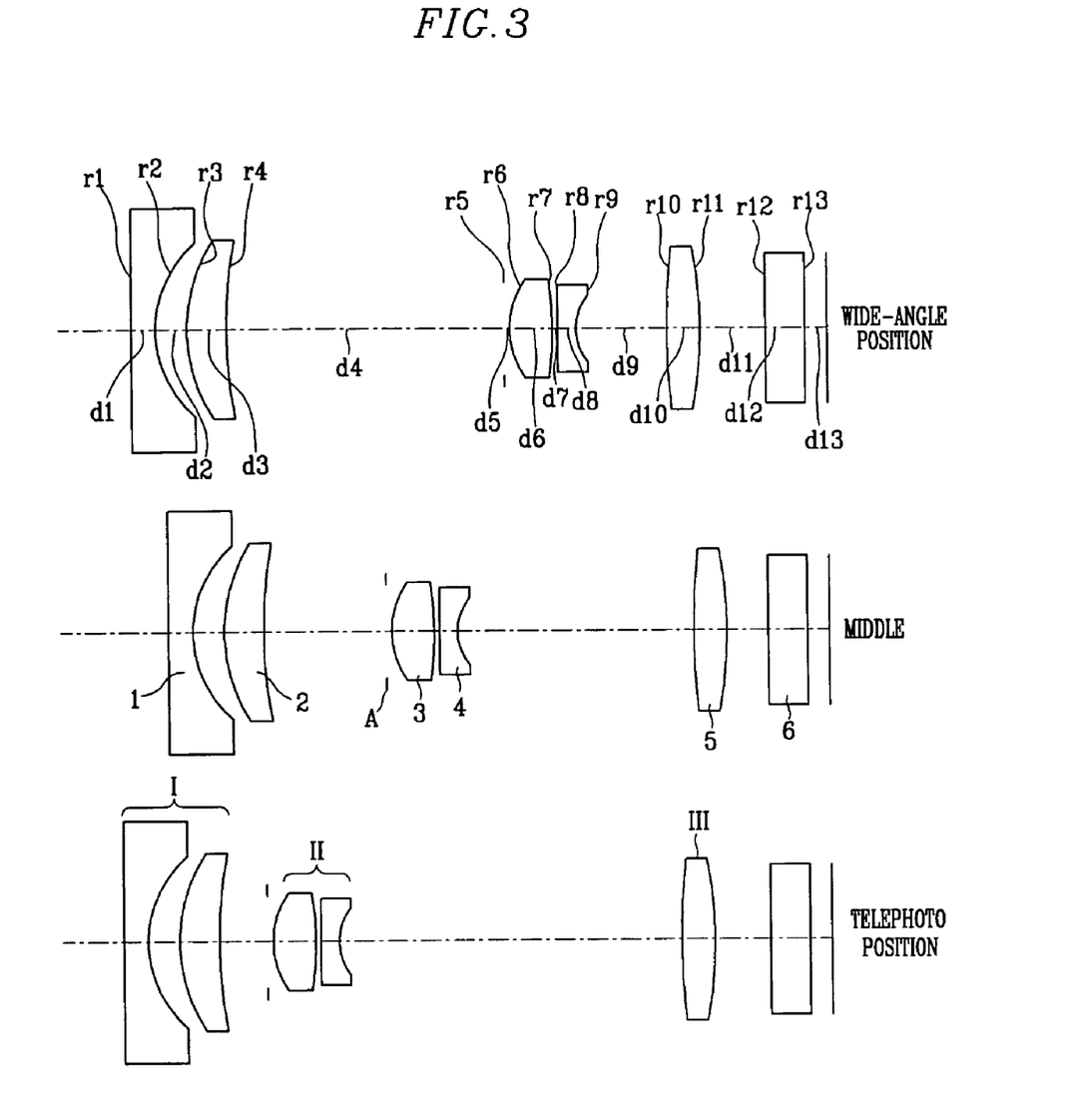
FIG. 3 illustrates the configuration of a zoom lens according to a second embodiment of the present invention by zoom position.

FIGS. 1 and 3 illustrate the configuration of a zoom lens by zoom position, according to an embodiment of the present invention.

As shown in FIGS. 1 and 3, the zoom lens may include, in order from an object side, a first lens group I having a negative refractive power, a second lens group II having a positive refractive power, and a third lens group III having a positive refractive power. Additionally, the zoom lens has an iris diaphragm A located between the first lens group I and the second lens group II and operated in association with the second lens group II.

The first lens group I includes at least one lens having a negative refractive power, and one lens having a positive refractive power.

The second lens group II includes at least one lens having a positive refractive power, and one lens having a negative refractive power.

The third lens group III includes at least one lens having a positive refractive power.

Here, the first lens group I and the second lens group II may include at least one aspheric surface.

As illustrated in FIGS. 1 and 3, an embodiment may include a zoom lens having an NPP structure (negative refractive power, positive refractive power, positive refractive power). In these illustrations, each lens group is moved from the wide-angle position to the telephoto position while zooming. The zooming is performed in the direction of decreasing the distance between the first and second lens groups I and II and increasing the distance between the second and third lens groups II and III. Particularly, the distance between the third lens group III and the image side is greater at the wide-angle position than at the telephoto position.

The structures of the respective lens groups are described by way of the first and second embodiments of the present invention in further detail.

Next, the function of the zoom lens of the above-stated structure according to an embodiment of the present invention will be described.

To have a high zoom ratio with a relatively simple configuration, the second lens group II may be moved along the optical axis to perform a zooming, and the first lens group I and the third lens group III may be moved to compensate for the resultant movement of the image side.

More specifically, the first lens group I or the first and third lens groups I and III may move nonlinearly to compensate for the movement of the image side caused by the simple movement of the second lens group II during the zooming. Further, movement of the third lens group III may correct the focal position according to the zooming. The movable groups, i.e., the moving lens groups, are less so in case of focusing with the third lens group III, so the miniaturization of the overall optical system is facilitated.

In the embodiment, the first lens group I having a negative refractive power and the second lens group II having a positive refractive power are positioned on the object side to secure a wide angle of view greater than 60° at the wide-angle position and a sufficient amount of marginal light. Particularly, high-variance lenses are arranged in the first lens group I so as to cause as little magnification chromatic aberration as possible and attain a high resolution. Namely, at least one lens having a negative refractive power and one lens having a positive refractive power are arranged in the first lens group I. In the first lens group I, the lenses are arranged in the order of a negative refractive power and a positive refractive power. The lens having a positive refractive power is formed of a high-variance material, so as to sufficiently correct the magnification chromatic aberration even in the optical system having a high magnification of greater than 3×.

In addition, a convex lens having a positive refractive power is arranged in the third lens group III to secure a sufficiently long retrofocal length. This allows the exit pupil to be as far from an image-forming medium as possible, so as to solve the problem of telecentricity in case of using an image-forming medium such as an image pickup device, i.e., to make the principal light from the peripheral image be linearly incident upon the image pickup device.

The aspheric surfaces for the first and second lens groups I and II are properly used to minimize distortion and to achieve a high image-forming performance adequate to an image-forming optical system for mega-pixel pickup devices.

The refractive power is distributed in order from positive to negative in the second lens group II so as to acquire a good optical performance for the whole image and to secure a high image-forming performance adequate for use with image pickup devices.

The zoom lens according to an embodiment satisfies the following conditional expression:

$$1.0 \leq \frac{L_{II}}{\sqrt{f_W f_T}} \leq 1.5 \qquad \text{[Conditional Expression 1]}$$

where $f_W$ denotes the total focal length at the wide-angle position; $f_T$ denotes the total focal length at the telephoto position; and $L_{II}$ denotes the moving distance of the second lens group II from the wide-angle position to the telephoto position.

The conditional expression 1 defines the ratio of the moving distance of the second lens group II to the composite focal length at the wide-angle position and the telephoto position. When the ratio exceeds the upper limit of conditional expression 1, the refractive power of the second lens group II deteriorates to increase the moving distance of the second lens group II from the wide-angle position to the telephoto position, and the increased overall length of the lens makes it difficult to realize miniaturization of the zoom lens.

When the ratio falls below the lower limit of conditional expression 1, the refractive power of the second lens group II increases to make it difficult to secure a required retrofocal length at the wide-angle position. This also makes it difficult to correct spherical aberration, coma, and astigmatism at the telephoto position.

The zoom lens according to an embodiment also satisfies the following conditional expression:

$$1.2 \leq \frac{|f_I|}{\sqrt{f_W f_T}} \leq 1.5 \qquad \text{[Conditional Expression 2]}$$

where $f_I$ denotes the focal length of the first lens group I.

Conditional expression 2 defines the ratio of the focal length of the first lens group I to the composite focal length at the wide-angle position and the telephoto position. When the ratio exceeds the upper limit of the conditional expression 2, the refractive power of the first lens group I deteriorates to increase the overall length of the optical system. This also makes it difficult to secure a required retrofocal length at the wide-angle position and to correct spherical aberration, coma, and astigmatism at the telephoto position.

When the ratio falls below the lower limit of conditional expression 2, the refractive power of the first lens group I increases to deteriorate the telecentricity.

In an embodiment, the zoom lens also satisfies the following conditional expression:

$$1.0 \leq \frac{f_{II}}{\sqrt{f_W f_T}} \leq 1.3 \qquad \text{[Conditional Expression 3]}$$

where $f_{II}$ denotes the focal length of the second lens group II.

Conditional expression 3 defines the ratio of the focal length of the second lens group II to the composite focal length at the wide-angle position and the telephoto position.

When the ratio exceeds the upper limit of conditional expression 3, the refractive power of the second lens group II deteriorates to increase the moving distance of the second lens group II while zooming, thereby making it difficult to attain miniaturization of the optical system.

When the ratio falls below the lower limit of conditional expression 3, the refractive power of the second lens group II increases, making it difficult to correct spherical aberration, or the like.

In some embodiments, the zoom lens also satisfies the following conditional expression:

$$1.5 \leq \frac{f_{III}}{\sqrt{f_W f_T}} \leq 2.0 \quad \text{[Conditional Expression 4]}$$

where $f_{III}$ denotes the focal length of the third lens group III.

The conditional expression 4 defines the ratio of the focal length of the third lens group III to the composite focal length at the wide-angle position and the telephoto position.

When the ratio exceeds an upper limit of conditional expression 4, the overall length of the optical system increases due to deterioration of the refractive power of the third lens group III. In addition, the telecentricity deteriorates.

When the ratio falls below the lower limit of the conditional expression 4, the refractive power of the third lens group III increases, making it difficult to secure a required retrofocal length at the wide-angle position and to correct spherical aberration, comma, astigmatism, or the like.

According to an embodiment, the zoom lens also satisfies the following conditional expression:

$$0.5 \leq \frac{f_{IP}}{|f_{II}|} \leq 1.1 \quad \text{[Conditional Expression 5]}$$

where $f_{IP}$ denotes the focal length of the lens having a positive refractive power in the first lens group I.

Conditional expression 5 defines the ratio of the focal length of the lens having a positive refractive power (hereinafter, referred to as "positive lens") in the first lens group I.

When the ratio exceeds the upper limit of the conditional expression 5, the refractive power of the positive lens (e.g., the second lens) in the first lens group I deteriorates, making it difficult to correct spherical aberration and chromatic aberration.

When the ratio falls below the lower limit of the conditional expression 5, the refractive power of the positive lens in the first lens group I is increased. This increases the sensitivity to the air spacing between the lens having a negative refractive power (hereinafter, referred to as "negative lens") (e.g., the first lens) and the positive lens (e.g., the second lens). Further, the eccentricity sensitivity is increased, making it difficult to manufacture lenses.

The zoom lens according to an embodiment of the present invention also satisfies the following conditional expression:

$$|n_{In} - n_{Ip}| \leq 0.15 \quad \text{[Conditional Expression 6]}$$

where $n_{In}$ denotes the refractive index of the negative lens (e.g., the first lens) in the first lens group I at d-line; and $n_{Ip}$ denotes the refractive index of the positive lens (e.g., the second lens) in the first lens group I at d-line.

The conditional expression 6 defines the difference of refractive index between the negative lens and the positive lens in the first lens group I at d-line. When the conditional expression 6 is not satisfied, it is difficult to correct distortion and magnification chromatic aberration and to realize miniaturization of the optical system because of the increased air spacing between the negative lens and the positive lens.

The first and second embodiments of the present invention that satisfy the aforementioned conditions (conditional expressions 1 to 6) will be described as follows.

In the description, "f" is the focal length, "ri (where i=1 to 13)" is the radius of curvature of a lens surface, "di (where i=1 to 13)" is the thickness of a lens or the distance between lenses, "nd" is the refractive index, and "v" is the variance. Here, the unit of length is "mm (millimeter)".

In an embodiment, the zoom lens has, an F-number Fno in a range from about 2.86 to about 5.38 between the wide-angle position and the telephoto position, the focal length f is in a range from 5.99 to 17.31 mm, and the angle of view (2ω) is in a range from 64.10° to 23.68°. In the middle of the zoom lens, the F-number Fno is 4.14, the focal length f is 11.34 mm, and the angle of view (2ω) is 35.56°.

FIG. 1 illustrates a configuration of the zoom lens according to a first embodiment. The zoom lens according to the first embodiment includes, as shown in FIG. 1, a first lens group I including a first lens 1 having a negative refractive power and a concave surface facing the image side, and a second lens 2 having a positive refractive power and a convex meniscus surface facing the object side; a second lens group II including a third lens 3 having a positive refractive power and convex surfaces facing the object side and the image side, respectively, and a fourth lens 4 having a negative refractive power and a convex meniscus surface facing the object side; and a third lens group III including a fifth lens having a positive refractive power and convex surfaces facing the object side and the image side, respectively. The zoom lens also has an optical filter 6 arranged on the image side of the fifth lens 5.

Various values associated with the component lenses of the zoom lens according to the first embodiment of the present invention are listed in Table 1.

TABLE 1

| Face Number | Radius of Curvature (r) | Thickness, Distance (d) | Refractive Index (nd) | Variance (v) |
|---|---|---|---|---|
| *1 | 184.86500 | 1.320000 | 1.8061 | 40.74 |
| *2 | 5.38500 | 1.590000 | | |
| 3 | 8.83000 | 1.860000 | 1.8467 | 23.78 |
| 4 | 25.84700 | D1 | | |
| 5 | ∞ | 0.220000 | | |
| *6 | 4.32600 | 2.090000 | 1.6935 | 53.20 |
| *7 | −16.92700 | 0.220000 | | |
| 8 | 16.43100 | 0.940000 | 1.8211 | 24.06 |
| *9 | 3.77900 | D2 | | |
| 10 | 51.57100 | 1.590000 | 1.7725 | 49.62 |
| 11 | −19.12800 | D3 | | |
| 12 | ∞ | 2.000000 | 1.5168 | 64.20 |
| 13 | ∞ | 1.00011 | | |

The symbol "*" indicates an aspheric surface. Aspheric surface coefficients can be expressed by the following equation:

$$x = \frac{c^2 y^2}{1 + \sqrt{1 - (K+1)c^2 y^2}} + Ay^4 + By^6 + Cy^8 + Dy^{10} \quad \text{[Equation 1]}$$

where x is the distance along the optical axis from the vertex of the lens; y is the distance in the direction vertical to the optical axis; c is the inverse (1/R) of the radius of curvature on the vertex of the lens; K is the conical constant; and A, B, C, and D are aspheric surface coefficients.

The aspheric surface coefficients according to the first embodiment of the present invention as determined by the Equation 1 are presented in Table 2. In the first embodiment, the first lens 1 of the first lens group I and the third lens 3 of the second lens group II have a double aspheric surface, and the fourth lens 4 of the second lens group II has an aspheric surface facing the object side.

TABLE 2

| Aspheric Surface Coefficients of First Face | | Aspheric Surface Coefficients of Second Face | |
|---|---|---|---|
| K | 0.000000 | K | −0.029739 |
| A | −0.149652E−03 | A | −0.633576E−03 |
| B | 0.117820E−04 | B | −0.202210E−05 |
| C | −0.265740E−06 | C | 0.349313E−06 |
| D | 0.227204E−08 | D | −0.382755E−07 |

| Aspheric Surface Coefficients of Sixth Face | | Aspheric Surface Coefficients of Seventh Face | | Aspheric Surface Coefficients of Ninth Face | |
|---|---|---|---|---|---|
| K | −1.173577 | K | 0.177981 | K | 0.129121 |
| A | 0.102349E−02 | A | 0.211388E−03 | A | 0.200441E−02 |
| B | −0.737500E−04 | B | −0.119775E−04 | B | −0.233347E−03 |
| C | 0.832566E−05 | C | −0.292611E−04 | C | 0.182909E−03 |
| D | −0.211766E−05 | D | 0.124517E−05 | D | −0.202375E−04 |

In the first embodiment, the variations of the distance D1 between the second lens 2 and the iris diaphragm A, the distance D2 between the fourth and fifth lenses 4 and 5, and the distance D3 between the fifth lens 5 and the optical filter 6 during the zooming are presented in Table 3.

TABLE 3

| Face Number | Wide-angle Position | Middle | Telephoto Position |
|---|---|---|---|
| D1 | 13.661 | 6.043 | 2.392 |
| D2 | 4.459 | 11.563 | 17.428 |
| D3 | 3.142 | 1.872 | 1.858 |

Figure 2A:
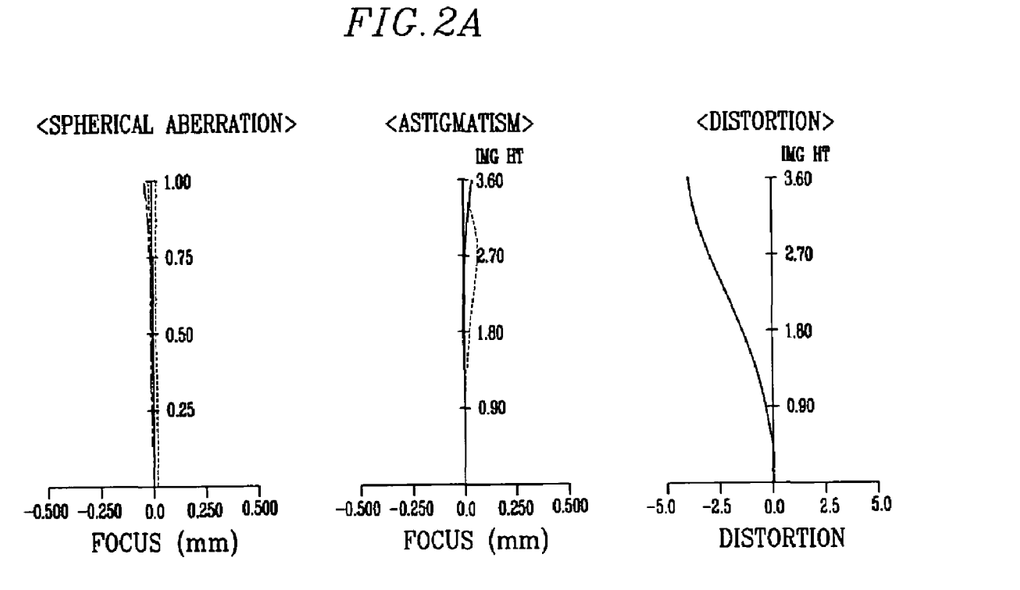
FIGS. 2a and 2b show aberrations of the zoom lens according to the first embodiment of the present invention at the wide-angle position and the telephoto position, respectively.
Figure 2B:
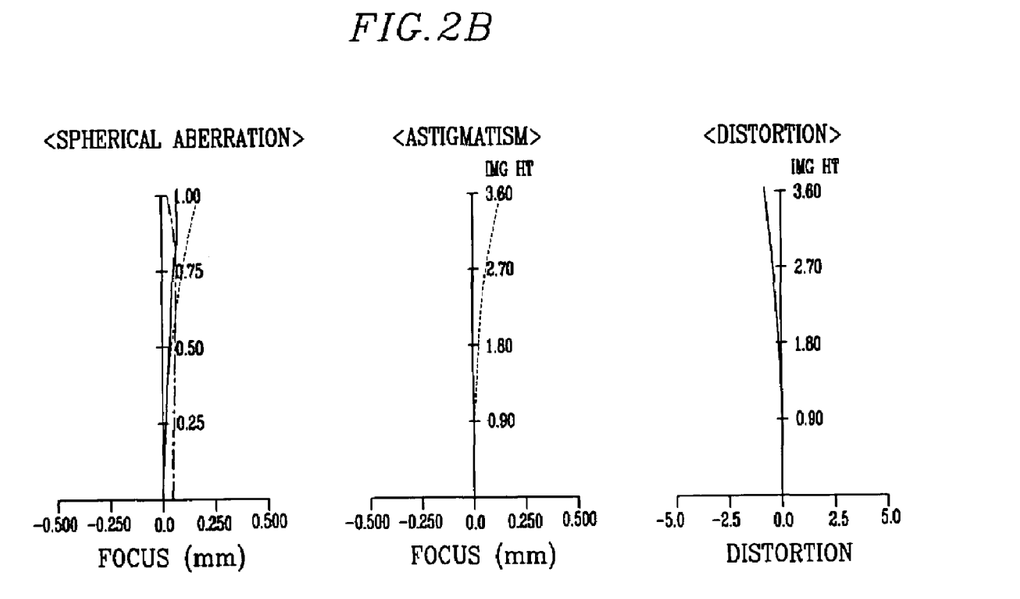

FIGS. 2*a* and 2*b* show aberrations of the zoom lens according to the first embodiment at the wide-angle position and the telephoto position, respectively.

For the zoom lens according to a second embodiment, the F-number Fno is in a range from about 2.84 to about 5.23 between the wide-angle position and the telephoto position, the focal length f is in a range from 5.99 to 17.30 mm, and the angle of view (2ω) is in a range from about 64.08° to about 23.78°. In the middle of the zoom lens, the F-number Fno is 4.10, the focal length f is 11.49 mm, and the angle of view (2ω) is 35.21°.

FIG. 3 illustrates the configuration of the zoom lens according to the second embodiment. The zoom lens according to the second embodiment has the same basic structure of the zoom lens according to the first embodiment, as illustrated in FIG. 3.

Various values associated with the component lenses of the zoom lens according to the second embodiment of the present invention are listed in Table 4.

TABLE 4

| Face Number | Radius of Curvature (r) | Thickness, Distance (d) | Refractive Index (nd) | Variance (v) |
|---|---|---|---|---|
| *1 | 250.00000 | 1.300000 | 1.8061 | 40.74 |
| *2 | 5.40900 | 1.600000 | | |
| 3 | 8.74900 | 1.860000 | 1.8467 | 23.78 |
| 4 | 24.28100 | D1 | | |
| 5 | ∞ | 0.250000 | | |
| *6 | 4.54100 | 2.080000 | 1.6935 | 53.20 |
| *7 | −14.40600 | 0.100000 | | |
| 8 | 8.79000 | 0.950000 | 1.8467 | 23.78 |
| 9 | 3.16600 | D2 | | |
| 10 | 42.44900 | 1.750000 | 1.5638 | 60.83 |
| 11 | −14.89800 | D3 | | |
| 12 | ∞ | 2.000000 | 1.5168 | 64.20 |
| 13 | ∞ | 0.999994 | | |

The symbol "*" indicates an aspheric surface. In the second embodiment, the first lens 1 of the first lens group I and the third lens 3 of the second lens group II have a double aspheric surface. The aspheric surface coefficients are presented in Table 5.

TABLE 5

| Aspheric Surface Coefficients of First Face | | Aspheric Surface Coefficients of Second Face | |
|---|---|---|---|
| K | 0.000000 | K | 0.071067 |
| A | −0.172793E−03 | A | −0.747020E−03 |
| B | 0.192128E−04 | B | 0.116833E−04 |
| C | −0.607117E−06 | C | −0.555478E−06 |
| D | 0.748020E−08 | D | −0.301979E−07 |

| Aspheric Surface Coefficients of Sixth Face | | Aspheric Surface Coefficients of Seventh Face | |
|---|---|---|---|
| K | −1.613182 | K | 0.020501 |
| A | 0.572952E−03 | A | −0.554082E−04 |
| B | −0.101665E−03 | B | −0.184503E−04 |
| C | 0.721736E−05 | C | −0.248313E−04 |
| D | −0.233288E−05 | D | 0.565663E−06 |

In the second embodiment, the variations of the distance D1 between the second lens 2 and the iris diaphragm A, the distance D2 between the fourth and fifth lenses 4 and 5, and the distance D3 between the fifth lens 5 and the optical filter 6 during the zooming are presented in Table 6.

TABLE 6

| Face Number | Wide-angle Position | Middle | Telephoto Position |
|---|---|---|---|
| D1 | 13.678 | 5.860 | 2.162 |
| D2 | 4.438 | 11.570 | 16.929 |
| D3 | 3.161 | 1.938 | 2.514 |

Figure 4A:
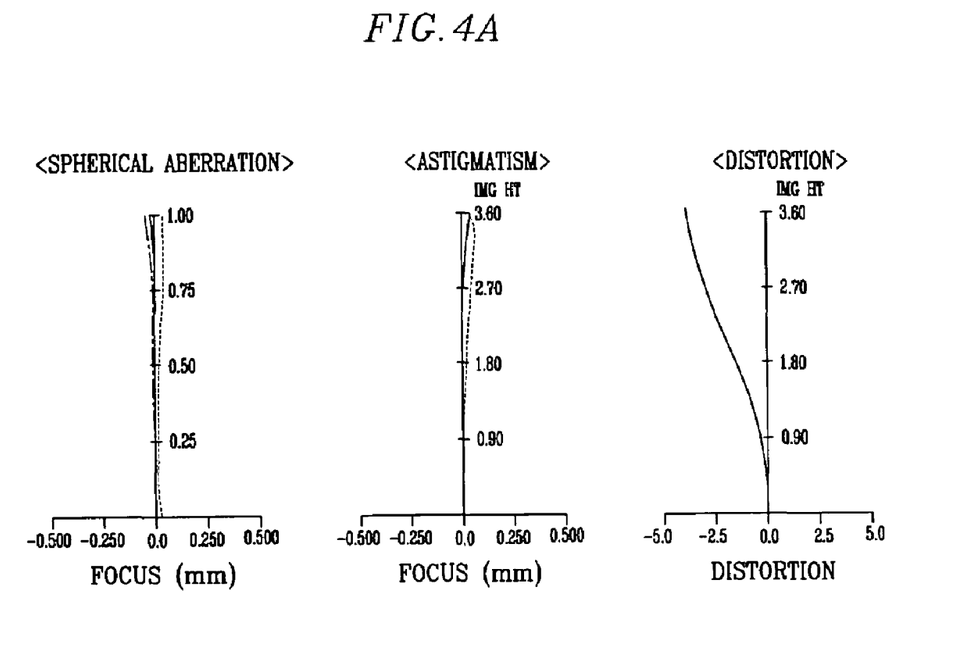
FIGS. 4a and 4b show aberrations of the zoom lens according to the second embodiment of the present invention at the wide-angle position and the telephoto position, respectively.
Figure 4B:
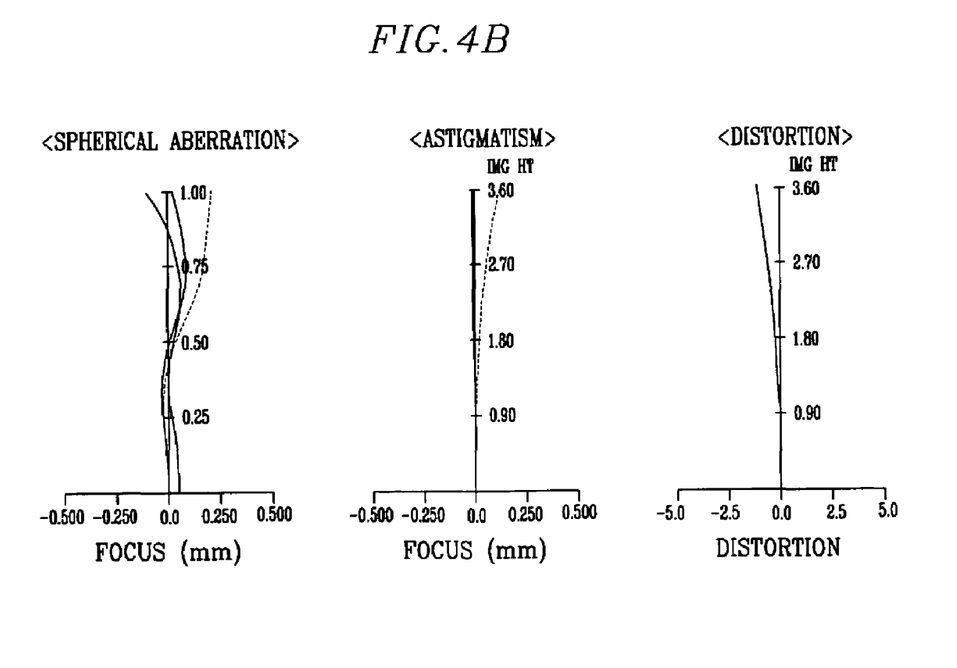

FIGS. 4*a* and 4*b* show aberrations of the zoom lens according to the second embodiment of the present invention at the wide-angle position and the telephoto position, respectively.

The zoom lenses according to the aforementioned embodiments of the present invention satisfy the above-stated conditions (Conditional Expressions 1 to 6), and the various values for the respective conditional expressions are presented in Table 7.

TABLE 7

|  | Embodiment 1 | Embodiment 2 |
| --- | --- | --- |
| Conditional Expression 1 | 1.15 | 1.16 |
| Conditional Expression 2 | 1.44 | 1.40 |
| Conditional Expression 3 | 1.07 | 1.06 |
| Conditional Expression 4 | 1.78 | 1.93 |
| Conditional Expression 5 | 1.02 | 1.06 |
| Conditional Expression 6 | 0.04 | 0.04 |

While this invention has been described in connection with what is presently considered to be the most practical and preferred embodiment, it is to be understood that the invention is not limited to the disclosed embodiments, but, rather, is intended to cover various modifications and equivalent arrangements included within the spirit and scope of the appended claims. For example, although the above-stated embodiments disclose values for the lenses in the case that the first and third lenses 1 and 3 have a double aspheric surface, those skilled in the art may also contrive values for the lenses in the case that each of the first and third lenses 1 and 3 has at least one aspheric surface.

As described above, the embodiments of the present invention provide a zoom lens that has a high zoom ratio with a relatively simple configuration.

The embodiments of the present invention also provide a miniature wide-angle zoom lens that has telecentricity adequate for solid-state image pickup devices such as a CCD, and high optical performance with chromatic aberration corrected.

What is claimed is:

1. A zoom lens comprising, in order from an object side:
   a first lens group having a negative refractive power, comprising a first lens having a negative refractive power and a second lens having a positive refractive power, wherein the first lens includes a convex meniscus surface facing the object side;
   a second lens group having a positive refractive power, comprising a third lens having a positive refractive power and a fourth lens having a negative refractive power; and
   a third lens group having a positive refractive power, comprising at least one fifth lens having a positive refractive power;
   wherein a distance between the third lens group and an image side is greater at a wide-angle position than at a telephoto position, and
   wherein the zoom lens satisfies the expressions, $$1.0 \leq \frac{L_{II}}{\sqrt{f_W f_T}} \leq 1.5, \text{ and } 1.2 \leq \frac{|f_I|}{\sqrt{f_W f_T}} \leq 1.5,$$

and $$1.2 \leq \frac{|f_I|}{\sqrt{f_W f_T}} \leq 1.5,$$

wherein $f_W$ denotes the total focal length at the wide-angle position; $f_T$ denotes the total focal length at the telephoto position; $L_{II}$ denotes the moving distance of the second lens group from the wide-angle position to the telephoto position; and $f_I$ denotes the focal length of the first lens group.

2. The zoom lens as claimed in claim 1, wherein the zoom lens further satisfies the expression, $$1.0 \leq \frac{f_{II}}{\sqrt{f_W f_T}} \leq 1.3,$$

wherein $f_{II}$ denotes the focal length of the second lens group.

3. The zoom lens as claimed in claim 1, wherein the zoom lens further satisfies the expression, $$1.5 \leq \frac{f_{III}}{\sqrt{f_W f_T}} \leq 2.0,$$

wherein $f_{III}$ denotes the focal length of the third lens group.

4. The zoom lens as claimed in claim 1, wherein the first lens of the first lens group has at least one aspheric surface.

5. The zoom lens as claimed in claim 4, wherein the third lens of the second lens group has at least one aspheric surface.

6. The zoom lens as claimed in claim 1, wherein the third lens of the second lens group has at least one aspheric surface.

7. The zoom lens as claimed in claim 1, wherein the zoom lens further satisfies the expression, $$|n_{In} - n_{Ip}| \leq 0.15,$$

wherein $n_{In}$ denotes the refractive index of the lens having a negative refractive power in the first lens group at d-line, and $n_{Ip}$ denotes the refractive index of the lens having a positive refractive power in the first lens group at d-line.

8. The zoom lens as claimed in claim 1, wherein the third lens group consists of one lens.

9. A zoom lens comprising, in order from an object side:
   a first lens group having a negative refractive power, comprising a first lens having a negative refractive power and a second lens having a positive refractive power, wherein the first lens includes a convex meniscus surface facing the object side;
   a second lens group having a positive refractive power, comprising a third lens having a positive refractive power and a fourth lens having a negative refractive power; and
   a third lens group having a positive refractive power, comprising at least one fifth lens having a positive refractive power,
   wherein a distance between the third lens group and an image side is greater at a wide-angle position than at a telephoto position;
   wherein the zoom lens satisfies the expressions, $$0.5 \leq \frac{f_{IP}}{|f_I|} \leq 1.1,$$

and $$1.5 \leq \frac{f_{III}}{\sqrt{f_W f_T}} \leq 2.0,$$

wherein $f_I$ denotes the focal length of the first lens group; $f_{IP}$ denotes the focal length of the lens having a positive refractive power in the first lens group; $f_{III}$ denotes the focal length of the third lens group: $f_W$ denotes the total focal length at the wide-angle position; and $f_T$ denotes the total focal length at the telephoto position.

10. The zoom lens as claimed in claim 9, wherein the zoom lens further satisfies the expression $$1.2 \leq \frac{|f_I|}{\sqrt{f_W f_T}} \leq 1.5.$$

11. The zoom lens as claimed in claim 9, wherein the first lens of the first lens group has at least one aspheric surface.

12. The zoom lens as claimed in claim 11, wherein the third lens of the second lens group has at least one aspheric surface.

13. The zoom lens as claimed in claim 9, wherein the third lens of the second lens group has at least one aspheric surface.

14. The zoom lens as claimed in claim 9, wherein the zoom lens further satisfies the expression, $$|n_{In} - n_{Ip}| \leq 0.15,$$

wherein $n_{In}$ denotes the refractive index of the lens having a negative refractive power in the first lens group at d-line; and $n_{Ip}$ denotes the refractive index of the lens having a positive refractive power in the first lens group at d-line.

15. The zoom lens as claimed in claim 9, wherein the third lens group consists of one lens.

16. The zoom lens as claimed in claim 9, wherein the zoom lens further satisfies the expression, $$1.0 \leq \frac{L_{II}}{\sqrt{f_W f_T}} \leq 1.5,$$

wherein $L_{II}$ denotes the moving distance of the second lens group from the wide-angle position to the telephoto position.

17. The zoom lens as claimed in claim 9, wherein the zoom lens further satisfies the expression, $$1.0 \leq \frac{f_{II}}{\sqrt{f_W f_T}} \leq 1.3,$$

wherein $f_{II}$ denotes the focal length of the second lens group.

* * * * *